United States Patent [19]

Maeshima et al.

[11] 4,046,888
[45] Sept. 6, 1977

[54] METHODS FOR CATALYTIC REDUCTION OF NITROGEN OXIDES

[75] Inventors: Tsugio Maeshima; Eiichiroh Nishikawa; Mitsuko Nakamura, all of Ohi, Japan

[73] Assignee: Toa Nenryo Kogyo Kabushiki Kaisha, Tokyo, Japan

[21] Appl. No.: 665,946

[22] Filed: Mar. 11, 1976

[30] Foreign Application Priority Data

June 12, 1975 Japan .................................. 50-71229

[51] Int. Cl.$^2$ ............................................ B01D 53/34
[52] U.S. Cl. .................................................... 423/239
[58] Field of Search ................................. 423/212, 239

[56] References Cited

U.S. PATENT DOCUMENTS

| 3,689,212 | 9/1972 | Petit et al. | 423/239 |
| 3,895,094 | 7/1975 | Carter et al. | 423/239 |

OTHER PUBLICATIONS

Katzer, J. R. in "Catalytic Chem. of Nitrogen Oxides", Plenum Press, 1975–symposium on 10/7/74.

Primary Examiner—G. O. Peters

[57] ABSTRACT

Process for removing nitrogen oxides from gaseous mixtures comprising the same. Ammonia in an amount excessive over the stoichiometric amount necessary for reducing the nitrogen oxides is introduced into a reaction zone containing a catalyst. Then, ammonia in a minimum amount necessary for reduction of the nitrogen oxides is introduced into the reaction zone.

11 Claims, 1 Drawing Figure

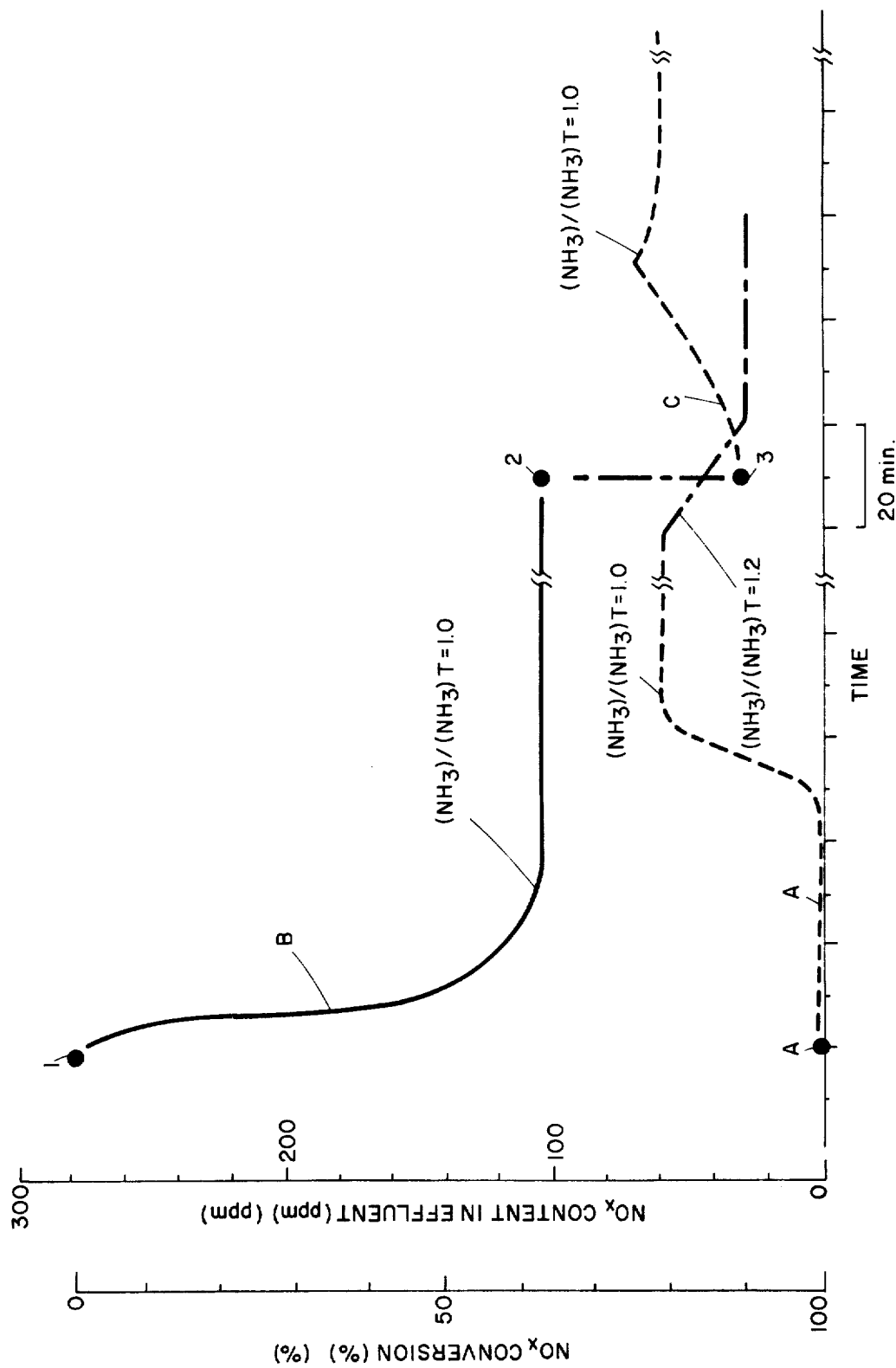

METHODS FOR CATALYTIC REDUCTION OF NITROGEN OXIDES

BACKGROUND OF THE INVENTION

This invention relates to a process for reducing the concentration of nitrogen oxides contained in a gaseous mixture. In particular, this invention relates to a process wherein the concentration of nitrogen oxides is reduced by catalytic reduction.

Nitrogen oxides are, of course, generally present in significant quantities in gaseous mixtures such as flue gases. Different methods have been used in the treatment of these gas mixtures. One type of treatment involves the catalytic reduction of the nitrogen oxides. As processes for catalytic reduction, two methods are known in the art: (1) a non-selective reduction method in which carbon monoxide, hydrogen or a lower hydrocarbon is used as the reducing agent, and (2) a selective reduction method in which ammonia is used as the reducing egent. The latter catalytic reduction method (using ammonia) is advantageous in that the amount of the reducing agent used can be reduced and nitrogen oxides can be removed at a high ratio. Accordingly, various modifications and improvements have been proposed on this method.

These reduction methods using ammonia are roughly classified into two groups, namely one in which a noble metal component such as platinum, palladium, rhodium, or iridium is used as the catalyst and another in which a base metal, particularly a non-noble transition metal component such as copper, iron, vanadium, chromium or molybdenum is used as the catalyst.

Noble metal catalysts are defective in that they are drastically poisoned by sulfur oxides generally contained in exhaust gases, and base metal catalysts are defective in that severe reaction conditions such as elevated reaction temperatures and reduced space velocities should be adopted in order to improve their activities. In view of the fact that exhaust gases discharged in large quantities from boilers which have now a very large scale should be treated for removal of nitrogen oxides therefrom and temperatures of these exhaust gases are generally low, it is desirable to develop a method in which nitrogen oxides can be removed effectively under such reaction conditions as a lower temperature and a higher space velocity. Further, if ammonia added as the reducing agent is discharged into open air in the unreacted state, there is a fear that it causes another environmental pollution. Accordingly, it is also desirable to develop a method in which no unreacted ammonia is discharged.

SUMMARY OF THE INVENTION

In accordance with this invention, gaseous mixtures such as flue gases are treated to reduce the nitrogen oxides content thereof by contacting with a catalyst an amount of ammonia in excess of the stoichiometric amount necessary to reduce the nitrogen oxides in the gaseous mixture. Next, the gaseous mixture is contacted with a zeolite catalyst in the presence of the minimum amount of ammonia necessary to reduce the nitrogen oxides contained therein.

BRIEF DESCRIPTION OF THE DRAWING

The Figure is a graph depicting the performance of the method of the present invention compared to prior art methods.

DETAILED DESCRIPTION OF THE INVENTION

According to the present invention, nitrogen oxides are removed from a gas containing the nitrogen oxides and oxygen by contacting the resulting gaseous mixture with a catalyst in the presence of ammonia to reduce the nitrogen oxides selectively.

In short, the present invention relates to a method for selectively reducing nitrogen oxides contained in exhaust gases from stationary sources, such as flue gas from the combustion furnace of power plants, by using ammonia as a reducing agent, and the most characteristic feature of the present invention resides in that the catalyst used is contacted with ammonia in an amount excessive over the stoichiometric amount necessary for reduction of nitrogen oxides in an exhaust gas to thereby activate the catalyst and then, the amount of ammonia is reduced to a minimum amount necessary for reduction of the nitrogen oxides to thereby effect the catalytic reduction.

A typical instance of a nitrogen oxide-containing exhaust gas to which the method of the present invention is applied is an exhaust gas from a fixed combustion apparatus using coal or petroleum as a fuel, and this exhaust gas has, in general, the following composition:

$NO_x$: about 100 to about 1,000 ppm
$SO_x$: about 100 to about 3,000 ppm
$O_2$: about 1 to about 10%
$CO_2$: about 7 to about 13%
steam: about 7 to about 13%

As pointed out hereinabove, a flue exhaust gas generally contains a sulfur oxides and oxygen in addition to nitrogen oxides. Accordingly, it is necessary to perform removal of nitrogen oxides while eliminating influences of sulfur oxides and oxygen. The nitrogen oxide present in flue gas (hereinafter referred to as "$NO_x$") is composed mainly of nitrogen monoxide (NO) and nitrogen dioxide ($NO_2$). The nitrogen oxide content in the flue gas depends on combustion conditions such as the nitrogen compound content in a fuel, the amount of air and the combustion temperature. The sulfur oxide content in the flue gas varies depending on the sulfur compound content in the fuel.

Ammonia is contacted with the exhaust gas maintained at about 200° to about 500° C. For example, in the case of an exhaust gas from a combustion furnace of a power plant, ammonia is added to the exhaust gas maintained at about 200° to about 500° C., which has been passed through an economizer.

In the activating treatment of the present invention, ammonia is contacted with the exhaust gas in an amount excessive over the stoichiometric amount necessary for reduction of nitrogen oxides contained in the exhaust gas.

Reduction of nitrogen oxides to nitrogen is expressed by the following reaction formulae:

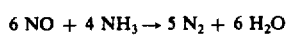
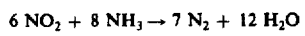

In the catalyst activating treatment of the present invention, the amount of ammonia is so selected that unreacted ammonia is not discharged, and it is generally at least about 1.2 times the stoichiometric amount. It is preferred that ammonia be introduced in an amount about 1.2 to about 3 times the stoichiometric amount.

This activating treatment is characterized in that the above-mentioned excessive amount of ammonia is added at prescribed intervals while the reduction reaction of nitrogen oxides is being performed. It is also possible to accomplish this activating treatment by mixing ammonia into nitrogen or air before the start of reduction of nitrogen oxides and contacting the catalyst with the resulting gaseous mixture. It is preferred that this activating treatment be conducted under the same conditions as adopted for the reduction reaction of nitrogen oxides.

After completion of this activating treatment, the amount of ammonia introduced in the reaction zone is adjusted to a minimum amount necessary for reduction of nitrogen oxides, generally not larger than about 1.2 times the stoichiometric amount, especially about 1.0 to about 0.7 times the stoichiometric amount.

It is preferred that contact of the nitrogen oxide-containing exhaust gas with the catalyst be performed by passing the exhaust gas through a fixed bed of the catalyst. As the reaction conditions, there may be adopted a reaction temperature of about 200° to about 500° C., preferably about 250° to about 400° C., and a gas space velocity of about 2,000 to about 100,000 V/H/V, preferably about 5,000 to about 30,000 V/H/V. Since the activity of the ammonia reduction of nitrogen oxides is lowered at higher or lower temperatures, good results are obtained when a mixture of the exhaust gas and ammonia is contacted with the catalyst bed at a temperature within the above-mentioned range.

As the catalyst that can be used for practicing the method of the present invention, there can be mentioned (1) a crystalline aluminosilicate, (2) a product obtained by exchanging an alkali metal ion in a crystalline alumino-silicate with at least one metal cation having an activity of reducing nitrogen oxides, and (3) a supported catalyst formed by supporting, by the impregnation treatment, an active metal component capable of reducing nitrogen oxides on a carrier obtained by removing an alkali metal ion from a crystalline aluminosilicate.

The above-mentioned crystalline aluminosilicates used in the present invention have a chain, laminate or three-dimensional reticulate framework structure wherein methane-type $SiO_4$ tetrahedra are combined with $AlO_4$ tetrahedra through oxygen atoms. The $AlO_4$ tetrahedra have a negative charge and, therefore, combine with a corresponding cation. The water of crystallization is thereby kept by the electrostatic force of the cation. The cations generally include alkali metal ions and alkaline earth metal ions.

Spaces surrounded by the reticulate structures of $SiO_4$ tetrahedra and $AlO_4$ tetrahedra form cavities or paths comprising the cavities connected with each other. Water of crystallization is kept in the cavities. By heating, the water is removed to leave porous adsorption medium.

Substances to be adsorbed are introduced in the cavities or paths through pores of the reticulte structure and thereby adsorbed therein. The pores having a uniform diameter exhibit a molecular sieve effect; namely, only molecules having diameters smaller than pore diameter are adsorbed and thereby separated, leaving molecules of larger diameters.

The crystalline aluminosilicates are classified according to pore diameter and $SiO_2/Al_2O_3$ molar ratio. In the present invention, those having pore diameters in the range of about 3-15 A and $SiO_2/Al_2O_3$ molar ratios of above about 2 are preferred. As the crystalline aluminosilicate, there may be used both natural and synthetic zeolites.

Suitable natural zeolites are:

Mordenite: $(Ca, K_2, Na_2) [AlSi_5O_{12}]_2 \cdot 7H_2O$
Erionite: $(K_2, Na_2, Ca) [AlSi_3O_8]_2 \cdot 6H_2O$
Natrolite: $Na_2[Al_2Si_3O_{10}] \cdot 2H_2O$
Chabazite: $(Ca, Na_2) [Al_2Si_4O_{12}] \cdot 6H_2O$
Faujasite: $Na_2Ca [Al_2Si_4O_{12}]_2 \cdot 16H_2O$ The natural zeolites contain alkaline earth metals, with alkali metals.

As the synthetic zeolites, there may be used synthetic faujasite and synthetic mordenite. The synthetic faujasites include:

Zeolite-A: $1.0 \pm 0.2M_{2/n}O : Al_2O_3 : 1.85 \pm 0.5SiO_2 : YH_2O$ (wherein M represents a metal, $n$ represents a valence of M and Y represents a number of about 6 or below).

Zeolite-X: $1.0 \pm 2M_{2/n}O : Al_2O_3 : 5 \pm 0.5SiO_2 : YH_2O$ (wherein M represents a metal of a valence of from 1 to 3, inclusive, $n$ represents a valence of M and Y represents a number of about 8 or below).

Zeolite-Y: $0.9 \pm 0.2Na_2O : Al_2O_3 : WSiO_2 : YH_2O$ (wherein W represents a number between 3 and 6, inclusive, and Y represents a number of about 9 or below).

The synthetic mordenites include, for example:

Zeolite-L: $1.0 \pm 0.1M_{2/n}O : Al_2O_3 : 0.4 \pm 0.5SiO_2 : YH_2O$ (wherein M represents a metal, $n$ represents a valence of M, and Y represents a number from 0 to 7, inclusive).

Especially preferred crystalline aluminosilicates are those having a pore diameter in the range of about 6–13 A and $SiO_2/Al_2O_3$ molar ratio of about 2–6. For example, synthetic faujasite having a pore diameter of abut 8–9 A and $SiO_2/Al_2O_3$ molar ratio of about 2–3 and other synthetic faujasites having a pore diameter of about 8–9 A and $SiO_2/Al_2O_3$ molar ratio of about 4–6 are preferred.

A zeolite catalyst having incorporated therein an active metal ion is prepared by contacting a crystalline aluminosilicate with an aqueous or organic solution of an active metal compound according to a customary method. The ion exchange ratio is not particularly critical, but it is generally preferred that the ion exchange ratio be about 60 to about 100%.

As the active metal, there is employed at least one member selected from copper, cobalt, nickel, vanadium, molybdenum, chromium, tungsten, manganese, platinum, silver and iridium.

The catalyst suitable for the practice of the present invention is formed by reducing the content of alkali metal in a crystalline aluminosilicate below 0.6 equivalent per gram atom of aluminum and supporting at least one active metal compound on the so treated aluminosilicate by the impregnation treatment.

The ion-exchange for reducing the alkali metal content in the aluminosilicate below 0.6 equivalent per gram atom of aluminum may be accomplished by any method, as far as it can reduce the alkali metal content below the above-mentioned level. In general, this ion exchange is accomplished by contacting an aluminosilicate with an aqueous or non-aqueous (organic solvent or the like) solution containing a hydrogen ion, an ion capable of being converted to a hydrogen ion, an alkaline earth metal ion or a rare earth metal ion. For this ion exchange treatment, water is the medium most preferred in view of the operation and apparatus. Any organic solvents capable of ionizing the metal compound used can also be employed. For example, alcohols such as methanol, ethanol, propanol and butanol, amides such as dimethylformamide and diacetamide, ethers and ketones are preferably employed.

An ion convertible into hydrogen ion is ammonium ion from organic and inorganic ammonium compounds such as ammonium chloride, ammonium sulfate, ammonium carbonate, ammonium bromide, ammonium bicarbonate, ammonium sulfide, ammonium nitrate, ammonium formate, ammonium acetate, ammonium hydroxide, tetraalkyl ammoniumammonium (tetramethyl ammonium) and tetramethyl ammonium hydroxide. The aluminosilicates ion-exchanged with ammonium ion are converted into hydrogen ion-containing aluminosilicates by calcination, thereby releasing ammonia.

As rare earth metal ion sources, there may be used salts of metals such as cerium, lathanum and praseodymium. Suitable salts include, for example, chlorides, sulfates, sulfides, nitrates, nitrites, carbonates, bicarbonates, acetates, benzoates, formates and tartarates. Particularly preferred metal salts are chlorides, nitrates and acetates.

As alkaline earth metal ion sources, there may be used inorganic and organic salts such as chlorides, bromides, carbonates, sulfates, nitrates, acetates, formates, oxalates of calcium, magnesium and strontium.

The ion exchange treatment for the catalyst will now be described.

An alkali metal-containing aluminosilicate is immersed once or repeatedly in a medium containing a hydrogen ion, an ion capable of being converted to a hydrogen ion, an alkaline earth metal ion or a rare earth metal ion. Alternatively, a medium containing a cation such as mentioned above is conveyed through a contact column packed with an alkali metal-containing aluminosilicate to bring the alumino-silicate into contact with such medium. The specific amount of the alkali metal is removed from the aluminosilicate by the ion exchange with the above-mentioned cation.

Such conditions as the cation concentration in the medium, the contact time and the amount of the alumino-silicate used for the ion exchange are chosen so that the the alkali metal content in the aluminosilicate is reduced below 0.6 equivalent, preferably 0.2 to 0.6 equivalent per gram atom of aluminum.

The aluminosilicate ion-exchanged with ammonia can be converted to a hydrogen ion-exchanged aluminosilicate by washing the aluminosilicate and calcining it at about 300° to about 700° C. to release the ammonium ion.

An especially preferred ion-exchange method is one in which the alkali metal ion is exchanged with an ammonium ion.

In addition to the crystalline aluminosilicate, there may be employed a mixture of crystalline alumino-silicate and, incorporated therein, about 1 to about 30% by weight of a refractory substance. Examples of refractory substances include at least one inorganic oxide selected from alumina, magnesia, titania, zirconia, hafnia, silica and diatomaceous earth. Further, in preparing a molded article of the catalyst, it is possible to add a suitable amount, for example, about 2 to about 40% by weight, of alumina sol or the like as a binder.

The above-mentioned active metal component having an activity of reducing nitrogen oxides is supported on the thus prepared aluminosilicate carrier by the impregnation treatment. Most preferred metals are copper, iron, chromium, and vanadium, and better results are obtained when at least one metal selected from them is employed.

The active metal component is preferably employed in the form of a metal, a metal oxide, a metal sulfate or a mixture thereof. An especially preferred form is a sulfate in the case of copper and iron and an oxide in the case of chromium and vanadium.

The amount of the active metal component in the catalyst is a catalytically effective amount, for example, about 1 to about 20% by weight (as metal), preferably about 2 to about 10% by weight, based on the final catalyst.

The active metal component is supported on the aluminosilicate by the impregnation treatment. This impregnation treatment comprises steps of immersing the above-mentioned aluminosilicate carrier in an impregnation solution formed by dissolving a soluble compound of the active metal in a suitable medium and separating from the solution the active metal component-impregnated carrier. The concentration of the active metal compound in the impregnation solution, the amount of the solution is used for the impregnation treatment, the impregnation time and the impregnation temperature are chosen appropriately so that a desired amount of the active metal component is supported on the alumino-silicate carrier.

The preferred impregnation time is about 5 minutes to about 1 hour, which is much shorter than the time required in the ion exchange method. It is important that the active metal component should be supported under such conditions that cations in the aluminosilicate, such as alkali metal, alkaline earth metal, hydrogen and rare earth metal ions, are not removed from the aluminosilicate.

The soluble compound of the active metal to be used for the impregnation treatment is a compound that can be decomposed at a high temperature and can be converted to an oxide by calcination. Preferred soluble compounds include inorganic salts such as nitrates, chlorides and sulfates and organic salts such as acetates, tartarates and oxalates.

As the medium of the impregnation solution, there may be employed water, inorganic acids, organic acids, other organic solvents and mixtures thereof. Preferred inorganic acids are hydrochloric acid, nitric acid and sulfuric acid. Preferred organic acids are mono- and poly-carboxylic acids such as acetic acid and citric acid.

As other organic solvent, there are preferably employed alcohols, aldehydes, amines and esters. Alcohols having 1 to 10 carbon atoms, especially isopropyl, alcohol, n-butyl alcohol, isobutyl alcohol, pentyl alcohol and isopentyl alcohol, are preferably employed. Aldehydes having 1 to 10 carbon atoms, especially acetaldehyde, ethylaldehyde and propylaldehyde, are preferably employed. As the amine, there can be employed, for example, alkyl amines such as dimethyl amine and triethyl amine, and as the ester, there can be used, for example, ethyl formate, ethyl acetate, isopropyl acetate and butyl acetate.

Impregnation of the active metal component will now be described by reference to copper as the active metal component.

An aluminosilicate carrier prepared according to the above-mentioned method is immersed in an aqueous solution of copper nitrate, copper chloride or copper sulfate. The impregnation treatment is thus carried out under the above-mentioned conditions, and the copper component is supported on the aluminosilicate carrier.

After this impregnation treatment, the supported catalyst is separated from the medium, and it is heated to a temperature of about 80° to about 150° C. in the presence or absence of oxygen. Then, the supported catalyst is calcined at a temperature of about 300° to about 700° C. to thereby convert the metal compound to an oxide acting as an active metal component.

The form of the catalyst used in the method of the present invention is not particularly critical, but it is generally preferred that the catalyst be molded to have a form having a large contact surface and facilitating passage of the gas, such as a cylindrical or spherical form or a form resembling a Raschig ring.

In one embodiment of the present invention, the temperature of an exhaust gas containing nitrogen oxides, sulfur compounds and oxygen is adjusted to about 200° to about 500° C. and ammonia is incorporated in the exhaust gas in an amount not smaller than about 1.2 times, preferably about 1.2 to about 3 times, the stoichiometric amount necessary for reduction of nitrogen oxides contained in the exhaust gas. Then, the resulting gas mixture is contacted with a fixed bed of a zeolite catalyst, wherein the zeolite catalyst is activated. Then, the amount of ammonia is reduced to about 1.0 to about 1.2 times the stoichiometric amount necessary for reduction of the nitrogen oxides, and reduction of the nitrogen oxides is carried out. This catalyst-activating treatment is conducted at prescribed intervals for about 20 to about 90 minutes by increasing the amount fed of ammonia to the above-mentioned excessive amount and contacting the catalyst with ammonia.

According to another embodiment of the present invention, the catalyst is contacted in advance with ammonia-containing nitrogen gas or air, and then ammonia in the above-mentioned minimum amount necessary for reduction of nitrogen oxides in the exhaust gas is incorporated into the exahust gas in the same manner as described above and the gaseous mixture is subjected to the catalytic reduction of nitrogen oxides.

FIG. 1 is a graph showing conversions of nitrogen oxides obtained in the methods of the present invention and a comparative method. In FIG. 1, a curve connecting points 1 and 2 shows the conversion of nitrogen oxides obtained when ammonia is added to the exhaust gas in an amount equal to the stoichiometric amount necessary for reduction of nitrogen oxides. From this curve, it is seen that a stationary value is attained after passage of about 30 minutes. When an excessive amount of ammonia is added to the above gas mixture, the conversion of nitrogen oxides is improved from the point 2 to the point 5, and, then, the stationary state is attained and continued. The conversion attained when nitrogen oxides are reduced by adding a stoichiometric amount of ammonia to the exhaust gas after the catalyst-activating treatment according to the present invention is shown by curve A, and as is seen from the curve, the conversion is increased to substantially 100% by the addition of ammonia and, then, the stationary state is attained and continued.

The following effects can be attained by the present invention.

First, by the activating treatment comprising contacting a zeolite catalyst with an excessive amount of ammonia, the nitrogen oxide-reducing activity of the catalyst is highly improved. Secondarily, by using ammonia in a minimum amount necessary for reduction of nitrogen oxides after the activating treatment, a very high reducing activity can be attained. Accordingly, no ammonia is present in the exhaust gas discharged in open air and, hence, occurrence of secondary pollution can be prevented.

The present invention will now be described in detail by reference to the following Examples.

EXAMPLE 1

20 ml of a copper-supported zeolite catalyst (extrusion-molded to a form having a diameter of 1.5 mm and a length of 6 mm) prepared according to a method described below was filled in a quartz reaction tube having an inner diameter of 20 mm. A gaseous mixture formed by incorporating ammonia into a synthetic flue gas having a composition described below, so that the ammonia content in the gas was 250 ppm (1.5 times the stoichiometric amount of $NH_3$ required for reducing 250 ppm of NO in the synthetic gas according to the reaction expressed by the formula,

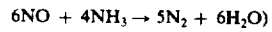

$$6NO + 4NH_3 \rightarrow 5N_2 + 6H_2O)$$

was introduced into the packed test tube at a gas space velocity of 5,000 V/H/V and a catalyst bed temperature of 250° C.

Composition of Synthetic Flue Gas:

NO: 250 ppm
$CO_2$: 10%
$O_2$: 3%
Steam: 10%
$N_2$: balance

After the above activating treatment, ammonia was added to the above synthetic flue gas in such an amount that the ammonia concentration in the gas was 167 ppm (the stoichiometric amount necessary for reduction of 250 ppm of NO), and the gaseous mixture was introduced into the reaction tube at a gas spaced velocity of 5,000 V/H/V and a catalyst bed temperature of 250° C. Results are shown in Curve A of FIG. 1, from which it is seen that the conversion of NO was substantially 100% for about 50 minutes from the start of the reaction, and after the intermediate state, the stationary state was attained, where the stationary value of the nitrogen oxide conversion was 78%. At this point, if the amount of ammonia was increased to 1.2 times the stoichiometric amount, the nitrogen oxide conversion was elevated, and after the intermediate state, the stationary state was attained again. From this fact, it was found that the minimum amount necessary for activation of the catalyst was about 1.2 times the stoichiometric amount.

Catalyst Preparation

Copper-supported zeolite catalyst was prepared as follows.

100 grams of zeolite-Y (extrusion-molded, synthetic faujasite having a diameter of 1.5 mm and a length of 6 mm) were immersed in 1,000 ml of 2.1 N aqueous ammonium chloride solution. Ion exchange was effected under proper agitation at room temperature for about 24 hours. After completion of the ion exchange, the zeolite was taken out from the solution, washed with water, dried and then calcined at 500° C. for 3 hours in air to obtain catalyst carrier containing 0.33 equivalent of sodium per gram-atom of aluminum in the zeolite. 50 grams of the catalyst carrier were immersed in 100 ml of an aqueous solution containing 3 wt. % of Cu prepared from copper nitrate $Cu(No_3)_2 \cdot 3H_2O$ and the whole was allowed to stand at room temperature for 30 minutes.

The carrier was taken out from the solution, dried and calcined at 500° C. for 16 hours to obtain zeolite catalyst carrying 3 wt. % copper.

EXAMPLE 1A 20 ml of the same copper-supported zeolite catalyst as used in the Example was filled in a quartz test tube having an inner diameter of 20 mm. A gaseous mixture obtained by incorporating ammonia into a synthetic flue gas having a composition described below, so that the ammonia concentration was 167 ppm (the stoichiometric amount necessary for reduction of 250 ppm of NO in the synthetic flue gas), was introduced into the packed test tube at a gas space velocity of 5,000 V/H/V and a catalyst bed temperature of 250° C. Results are shown in Curve B connecting the points 1 and 2 in FIG. 1, from which it is seen that the stationary value of the nitrogen oxide conversion was 62%.

Composition of Synthetic Flue Gas:

NO: 250 ppm
$CO_2$: 10%
$O_2$: 3%
Steam: 10%
$N_2$: balance

The activation treatment was then carried out for 20 minutes under the same conditions as adopted in Example 1, and ammonia was added in an amount of 167 ppm (the stoichiometric amount necessary for reduction of 250 ppm of NO) to obtain the nitrogen oxide conversion shown by Curve C in FIG. 1.

From comparison of results obtained in Example 1 with results obtained in comparative Example 1A, it is apparent that an obvious effect can be attained by the activating treatment of the present invention.

What is claimed is:

1. A process for reducing the concentration of nitrogen oxides in a gaseous mixture which comprises
  A. introducing ammonia in an amount between about 1.2 and 3.0 times the stoichiometric amount necessary for reducing the nitrogen oxides into a reaction zone containing a catalyst said catalyst comprising an active metal component and natural or synthetic zeolite having an $SiO_2/Al_2O_3$ molar ratio of at least about 2 and an alkali metal content within the range from 0.2 to 0.6 equivalents per gram atom of alumina, the introduction of ammonia at this rate continuing for at least about 20 minutes and then
  B. contacting the nitrogen oxides containing gas with the catalyst in the presence of ammonia in an amount between about 0.7 and 1.0 times the stoichiometric amount necessary for reducing the nitrogen oxides.
  C. repeating step (A) periodically.

2. The process of claim 1 wherein the reaction temperature is between about 200° and 500° C.

3. The process of claim 2 wherein the temperature range is from about 250° to about 450° C.

4. The process of claim 1 wherein the catalyst has a pore diameter of from about 3 to about 15 A.

5. The process of claim 1 wherein about 1 to about 30% by weight of a refractory substance is incorporated in the catalyst.

6. The process of claim 1 wherein the active metal component of the catalyst is taken from the group consisting of copper, iron, chromium and vanadium.

7. The process of claim 6 wherein the amount of metal component is about 1 to about 20% by weight.

8. The process of claim 1 wherein the catalyst is molded into a shape having a large contact surface area.

9. The process of claim 1 wherein the catalyst is arranged in a fixed bed.

10. The process of claim 1 wherein the nitrogen oxides containing gas is a flue gas.

11. The process of claim 1 wherein the catalyst activation is accomplished before the gaseous mixture containing nitrogen oxides is contacted with the catalyst.

* * * * *